United States Patent Office 3,582,361
Patented June 1, 1971

3,582,361
FOOD FLAVORING COMPOSITIONS AND PROCESS OF MAKING AND USING SAME
Heinz Huth, Holzminden, Germany, assignor to Dragoco Gerberding & Co. G.m.b.H., Holzminden (Weser), Germany
No Drawing. Continuation-in-part of application Ser. No. 402,926, Oct. 9, 1964, now Patent No. 3,424,592. This application June 10, 1968, Ser. No. 735,516
Claims priority, application Germany, Oct. 12, 1963, P 12 39 925.6
Int. Cl. A23l 1/22
U.S. Cl. 99—140                    12 Claims

ABSTRACT OF THE DISCLOSURE

Composition for imparting fried onion flavor, taste, and aroma to food comprising an emulsion of (a) highly concentrated onion juice,
(b) a nutritive oil, and
(c) a fat emulsifier.

The oil content is preferably between 10% and 36%, the water content between 10% and 22%, the emulsifier content between 1% and 5% of the oil present, and the soluble onion solids content between 37% and 76%, while the viscosity is between 20,000 and 60,000 centipoises. By spray drying, vacuum drying, or freeze drying, the emulsion is converted into a solid composition in dry, particulate, freely flowing form, wherein preferably an encapsulating solid substance such as a vegetable gum, starch products, and other suitable materials are added.

CROSS-REFERENCE TO RELATED APPLICATION

This is a continuation-in-part of copending application Ser. No. 402,926 of Heinz Huth, filed Oct. 9, 1964, now U.S. Pat. No. 3,424,592, and entitled "Food Flavoring Compositions and Process of Making and Using Same."

BACKGROUND OF THE INVENTION (1) Field of the invention

The present invention relates to a process for the preparation of food flavoring compositions and more particularly to a process for the preparation of a composition having, and imparting to food, the natural, highly concentrated flavor and aroma of fried onions, and to such compositions.

(2) Description of the prior art

It is known to prepare fried onions industrially and in the kitchen by cutting fresh, peeled onions to small pieces and browning those pieces by heating them in salad oil or fat for cooking. The resulting pieces of fried onions are then added to the food, in most cases together with the fat.

However, this process has the disadvantage that the flavoring compounds formed on heating adhere to a large extent to the solid onion pieces which are insoluble in the food. Therefore, uniform distribution of the flavoring agents throughout the food is impossible.

Furthermore, when preparing fried onions in the kitchen, a considerable amount of the resulting flavoring substances escape and vaporize during the process. Therefore, it is necessary to add large amounts of fried onions to the food to impart thereto the desired taste and flavor of fried onions.

Moreover, this process has the disadvantage that non-uniformly fried onion pieces are obtained. Often the fat used for frying the onions is overheated whereby polymerization products of the fats are formed which have been found to be toxic.

In addition thereto the known process requires considerable work and is extremely troublesome due to irritation of the sense organs and the mucous membranes. Admixing the proper amounts of pieces of fried onions is inaccurate and complicated in the industrial preparation of food.

Merory in "Food Flavoring" published by Avi Publishing Co., Inc. of Westport, Conn., 1960, discloses on page 240 an onion flavor which is obtained by mixing

| | G. |
|---|---|
| Oil of onion | 0.6 |
| 95% Alcohol | 6.4 |
| Tween No. 80 | 30.0 |
| Propylene glycol | 30.0 |
| Sorbitol | 33.0 |
| Water | 900.0 |

Such a composition does not have the flavor and aroma of fried onions and represents a solution of a very small amount of oil of onion in a mixture of alcohol, propylene glycol, and sorbitol which are water-miscible solvents for the oil of onion and of Tween No. 80 as a dissolving aid. Although such a solution has the flavor and aroma inherent in the oil of onion, its flavor and aroma differs very considerably from that of fried onion. The oil of onion is the readily volatile component of onion juice. It is of only minor importance in the production of the fried onion aroma since, on frying the onions, most of said readily volatile oil evaporates and is lost. The formation of the typical fried onion flavor and aroma is caused not so much by the readily volatile onion oil but by difficultly volatile or non-volatile components of onions. The Merory composition thus does not have the flavor and aroma of fried onions but that of fresh onions.

Braff in U.S. Pat. No. 1,462,163 discloses the production of a flavored food preparation which closely resembles natural goose grease or chicken grease. Such a preparation is produced by roasting raw onions in vegetable fat to a golden brown color, filtering the onions from said liquid, and while hot, adding olive oil to the filtered liquid and stirring until the resulting product cools to a solid or semisolid condition. Braff's goose or chicken grease is more digestible, more palatable, and more stable than the natural goose or chicken grease because the animal fat in the natural product is replaced by a vegetable fat with the addition of a vegetable oil.

None of these known compositions meet all the requirements required from a composition useful in imparting to food the flavor, taste, and aroma of fried onions.

SUMMARY OF THE INVENTION

It is one object of the present invention to provide a composition having the flavor and aroma of fried onions which composition is free of the disadvantages of the heretofore used pieces of fried onions and which has proved to be highly useful in imparting to food the flavor, taste, and aroma of fried onions.

Another object of the present invention is to provide a composition which contains the natural flavor and aroma of fried onions in concentrated form.

These and other objects of the present invention and advantageous features thereof will become more apparent as the description proceeds.

In principle the composition according to the present invention consists of an emulsion of, preferably concentrated, onion juice, a nutritive and preferably a vegetable oil or fat, and a physiologically harmless fat emulsifier, which has been heated in a closed vessel at a temperature between about 100° C., and preferably about 110° C.,

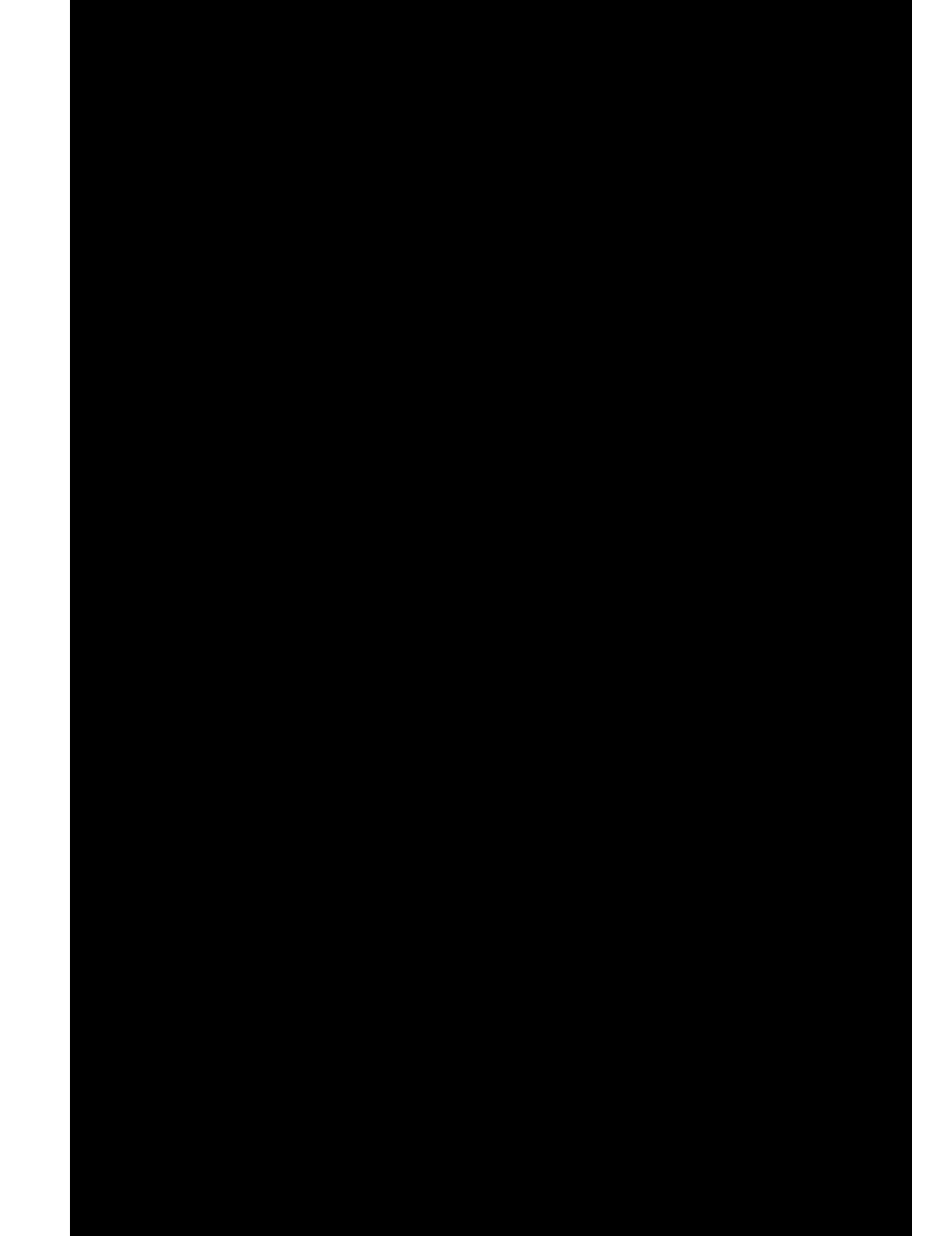

to the present invention with spice extracts with or without the addition of ethereal oils obtained from such spices, or, respectively, concentrated soup and gravy preparations such as mixtures of said fried onion emulsions with concentrated protein or yeast hydrolysates, fat, spices or spice essences, and sodium chloride.

DESCRIPTION OF THE PREFERRED EMBODIMENTS

The following examples serve to illustrate the present invention without, however, limiting the same thereto.

Example 1

0.35 kg. of the fat emulsifier sold under the trademark "Imwitor 900" by Chemische Werke Witten of Witten/Ruhr, Germany, which is a partially esterified glyceride mixture of saturated fatty acids derived from vegetable oils and having a mono-ester content of about 45%, is dissolved in 34.65 kg. of soybean oil, heated to 80° C. 65.0 kg. of refractometrically determined concentrated onion juice with a solids content of 76% is also heated to 80° C. The oil is intimately mixed with the concentrated onion juice by stirring in a vacuum. The resulting homogeneous mixture is then emulsified in an emulsifier under vacuum, thereby achieving very fine and uniform dispersion of the oil in the juice concentrate. The emulsion is passed into an autoclave heated to 130° C. while stirring, kept at said temperature for 20 minutes, and immediately cooled. The water content of the composition is about 15.5%.

An even more finely dispersed emulsion is obtained when preheating the solution of vegetable oil and emulsifier as well as the onion juice concentrate to 50–52° C. and producing the oil-in-water emulsion also at said temperature.

Example 2

90 kg. of concentrated onion juice are obtained by concentrating onion juice to a soluble solids content of 83.5% corresponding to a water content of 16.5%. The concentrated onion juice is emulsified with 9.7 kg. of winterized refined cotton seed oil in a high pressure emulsifier at 52° C. under a pressure of 300 atm. whereby 0.3 kg. of a mixture of the mono- and diglycerides of tallow fatty acids containing about 40% of mono-ester are added as emulsifier. The resulting emulsion is heated in an autoclave at 135° C. for 20 minutes and is then immediately cooled to 20° C. The composition exhibits a very agreeable fried onion aroma. One g. thereof is readily dispersed in one liter of water or 0.5% sodium chloride solution. Its water content is about 14.9%.

Example 3

The procedure is the same as described in Example 2. However, 64 kg. of onion juice with a soluble solids content of 83.5% are emulsified with 35 kg. of winterized refined cotton seed oil and 1.0 kg. of the emulsifier of Example 2. The water content of the resulting emulsion is about 10.6%. Fried onion aroma and taste of the resulting composition are slightly less pronounced than those of the composition of Example 2. The emulsion is fluid and pourable and stable for a prolonged period of time. Increasing the oil content produces unstable emulsions.

Example 4

The procedure is the same as described in Example 2. However, 80 kg. of onion juice with a soluble solids content of 81.25%, 19.4 kg. of winterized refined cotton seed oil, and 0.6 kg. of the emulsifier of Example 2 are emulsified. The water content of the resulting emulsion is about 15%. The emulsion is fluid and pourable, stable and its fried onion aroma, flavor and taste is about as strong as those of the emulsion according to Example 2 or 3.

Example 5

Using, in place of the emulsifier employed in the preceding examples, the same amount of soybean lecithin as emulsifier yields very stable emulsions. No separation of oil is observed when centrifuging the emulsion at 25° C. in a centrifuge at 6400×$g$ for 20 minutes.

The emulsifier Tween 80, i.e. polyoxyethylene sorbitan mono-oleate requires about 5% addition to produce stable emulsions.

For certain uses in the food industry, pulverulent fried onion flavoring compositions are preferred to the above described fluid product. Such particulate fried onion flavoring compositions can be prepared from the fluid concentrates by means of the known drying processes, especially vacuum drying, spray drying, or freeze drying, whereby a freely flowing powder is obtained. The oil droplets of the oil-in-water emulsion are surrounded and encapsulated by the solid matter of the onion juice concentrate during said drying process so that pulverulent products of excellent stability result. Preferably, however, the compositions according to the present invention are dried together with solid substances enclosing and thus encapsulating the fried onion aroma and flavor. Especially suitable solid encapsulating substances are, for instance, vegetable gums, such as gum arabic, starch, starch derivatives and hydrolyzation products, dextrins, glucose, and the like either as such or in mixtures with each other. When drying such mixtures of the emulsions according to the present invention and suitable encapsulating substances, flowable and substantially non-hygroscopic powders of excellent fried onion aroma, flavor, and taste, which do not become rancid and are stable for at least six months when kept at 20° C., are obtained. The water content of such powders is between about 2.0% and 4.0% and preferably between 2.8% and 3.0%. The amount of encapsulating substance is between about 50.0% and 80.0% and preferably between about 65.0% and 68.0%.

The following examples serve to illustrate the preparation of such solid compositions without, however, being limited thereto.

Example 6

10 kg. of fluid fried onion aroma obtained as described in the preceding examples by heating an emulsion of 19% of winterized cotton seed oil, 1% of soybean lecithin, 13.5% of water, and 66.5% of soluble onion juice solids at 135° C. for 20 minutes are mixed with 30 kg. of an aqueous 50% gum arabic solution at room temperature. The mixture is spray dried. The yield is 24.4 kg. of a dry, readily water-soluble powder of excellent stability on storage. The powder thus obtained contains about 3.7% of water. 0.3 g. of said powder dissolved in 100 cc. of an 0.5% sodium chloride solution and tested for aroma and flavor exhibits an excellent taste of fried onions.

Example 7

10 kg. of the fluid fried onion aroma prepared according to Example 1 are intimately mixed at room temperature with 15 kg. of an aqueous 50% gum arabic solution and 15 kg. of starch syrup of 43° Bé. (density 1.4216) and of 42 dextrose equivalents. The mixture is dried in a vacuum. The yield is 29.5 kg. of a relatively coarse powder which is comminuted. Fried onion aroma and flavor of said powder as well as its stability on storage are excellent.

The resulting solid fried onion flavor compositions differ essentially from heretofore known compositions by being instantaneously soluble in water, by having a very strong fried onion aroma and flavor, and by being stable on storage for at least six months. The known products of this type are insoluble in water and are spoiled after storage for a short period of time.

The emulsions as well as powders according to the present invention are suitable as flavoring additives for every kind of food for which roasted onions have been used heretofore. Their most noteworthy properties are the high concentration of fried onion flavor and the uniform aromatic strength which cannot be achieved when roasting fresh onions. They are readily dispersible in water and, therefore, easy to dose and incorporate into the food. Due to the high concentration of aroma and flavor they help to save storage space and do away with obtaining supplies of fresh onions and with the risks involved in storing the same. One kg. of the fried onion emulsion corresponds to about 15 kg. to 17 kg. of fried onions or to 45 kg. to 50 kg. of fresh onions.

The emulsions and powders according to the present invention are used for imparting fried onion flavor and aroma to fish and meat and thus are used by fish and meat processors and packers, manufacturers of soups, sauces and similar products. They are also useful as taste modifiers if added at about half the normal dosage. At this lower dosage they will contribute to a fuller, more delicious taste without suggesting the typical fried onion taste.

The dosage deepnds, of course, on the strength of fried onion flavor desired in the finished food product. A typical fried onion flavor is achieved, for instance, with a dose of about 100 g. to 150 g. of the emulsion for 100 kg. of food. An existing flavor is modified and improved by adding about 50 g. of the emulsion to 100 kg. of food.

Of course, many changes and variations in the starting materials, the onion juice, vegetable or other nutritive oil or fat, and emulsifier, in the concentration of the onion juice, in the manner of emulsifying the mixture of onion juice, oil or fat, and emulsifier, in the temperature, duration and other emulsifying and heating conditions, in the manner in which the resulting heated emulsion is worked up and used in the food industry and the preparation of food, and the like may be made by those skilled in this art in accordance with the principles set forth herein and in the claims annexed hereto.

I claim:

1. A composition for imparting fried onion flavor, taste, and aroma to food, said composition comprising an emulsion of concentrated onion juice, a nutritive oil, and a physiologically indifferent fat emulsifier, said emulsion having been heated to impart thereto the characteristic taste, flavor, and aroma of fried onions, said composition being stable on storage without the addition of chemical preserving agents for more than twelve months without deterioration of the flavor and taste of fried onions and without de-emulsification, being readily dispersible in water, and imparting to food a strong and distinct fried onion taste and flavor when admixed thereto in amounts of as low as 0.1%, said composition having a soluble onion juice solids content between about 37% and about 76%.

2. The composition according to claim 1, wherein the fat emulsifier is a monoglyceride.

3. The composition according to claim 1, wherein the nutritive oil is a vegetable oil.

4. The composition according to claim 1, wherein the oil content is between about 10% and 36%, the water content is between about 10% and about 22%, and the amount of emulsifier is between about 1% and 5% calculated for the oil present in the composition.

5. The composition according to claim 4, having a viscosity between about 20,000 centipoises and about 60,000 centipoises determined at 20° C.

6. The composition according to claim 1, wherein the emulsifier is soybean lecithin.

7. The composition according to claim 4, wherein the oil content is between about 20% and 23% and the water content is between about 13% and 15%.

8. The composition according to claim 1, in dry, particulate, freely flowing form.

9. The composition according to claim 8, the water content of said dry composition being between about 2.0% and 4.0%, the dried emulsion particles being encapsulated by a water-soluble encapsulating solid substance not substantially affecting flavor and aroma of the emulsion, the amount of encapsulating substance in said composition being between about 50.0% and 80.0%.

10. The composition according to claim 9, wherein the solid encapsulating substance is a vegetable gum.

11. The composition according to claim 10, wherein the solid encapsulating substance is gum arabic.

12. The composition according to claim 19, wherein the solid encapsulating substance is a mixture of a vegetable gum and starch hydrolyzation products.

References Cited

UNITED STATES PATENTS

| | | | |
|---|---|---|---|
| 1,462,163 | 7/1923 | Braff | 99—118 |
| 3,159,585 | 12/1964 | Evans et al. | 99—140 |

OTHER REFERENCES

Merory, "Food Flavorings," AVI Publishing Co., Inc., Westport, Conn. (1960), p. 240.

MORRIS O. WOLK, Primary Examiner

W. BOVEE, Assistant Examiner

U.S. Cl. X.R.

99—123

UNITED STATES PATENT OFFICE
Certificate of Correction

Patent No. 3,582,364

June 1, 1971

Henry J. Rose et al.

It is certified that error appears in the above-identified patent and that said Letters Patent are hereby corrected as shown below:

In the grant (only), cancel the second page containing columns 9, 10, 11 and 12, and insert after column 4, the page containing columns, 5, 6, 7 and 8.

surfactant having an HLB number greater than 7 and giving a surface tension less than 50 dynes/cm.$^2$ at 0.2% concentration in water, e.g. a polyoxyethylene or polyoxypropylene type surfactant. In (A), (B) and (C), the fatty substituents are preferably of about the same chain length. The three ingredients of the coating composition are nontoxic. The three ingredients of the emulsion are usually modified with a buffer such as sodium bicarbonate to adjust and maintain the pH and are so proportioned and chosen such that the contact angle for droplets of water on the inner surface of the casing is about 70°–90° (preferably 80°–90°) and the contact angle for oil droplets is about 40°–70° (preferably 40°–60°).

INGREDIENTS OF COATING COMPOSITION

The coating composition set forth above contains (A) a hydrophobic material, (B) a water-insoluble, monomeric fatty material with a polar end group and having an HLB number from 1 to 10, and (C) an at least partially water-soluble surfactant having an HLB number greater than 7 and giving a surface tension less than 50 dynes/cm.$^2$ at 0.2% concentration in water, buffered to a pH of 3–9 suitable for stability of ingredient (A) (e.g. about pH 6–9 for a ketene dimer, fatty isocyanate, or fatty imine, or pH 3–6 for a fatty chromium complex).

Ingredient A

The hydrophobic material may be a dimer of a fatty ketene, a fatty isocyanate, an N-fatty-imine or fatty chromium (or similar metal) complex, having a reactive functional group capable of reacting with and adhering to the surface of the casing.

The ketenes which are preferably used in the aqueous emulsion are diketenes of the empirical formula

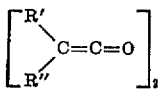

where R' and R'' are selected from the group consisting of hydrogen and $C_8$–$C_{26}$ alkyl, aryl, and cycloalkyl radicals, not more than one of the groups R' and R'' being hydrogen. These ketenes are generally prepared from naturally occurring fatty acids, and the total number of carbon atoms and subsidiary groups corresponds to the skeleton of the acid from which the ketene was derived. In general, it is preferred to use ketenes (diketenes) which are solid at ordinary temperatures. Greatly preferred are diketenes where R' is $C_{12}$–$C_{18}$. Such compounds and their production are described further in detail in U.S. Pat. 2,762,270, and emulsions of said ketenes are described in U.S. Pat. 2,856,310. In particular, hexyl ketene dimer, decyl ketene dimer, hexadecyl ketene dimer, hexadecenyl ketene, a fatty isocyanate, an N-fatty-imine or fatty chrodimer, octadecyl ketene dimer, dimers of mixtures of ketenes obtainable from fats, oils, and the like, as well as dimers of monomeric, monoalkyl, and monoaryl ketenes, dialkyl ketenes, diaryl ketenes, cycloalkyl ketenes, and dicycloalkyl ketenes, and the like, including, for example, phenyl ketene, dioctyl ketene, tolyl ketene, decyl phenyl ketene, cyclohexyl ketene, benzyl ketene, and their dimers may be employed.

Commercially available ketenes which are especially useful in the coating of sausage casings are diketenes sold under the trademark Aquapel which are alkyl ketene dimers or mixtures thereof.

Hydrophobic materials other than a dimer of a fatty ketene which combine chemically or absorptively with the interior wall of the sausage casing may also be employed instead of the ketene dimer in the aqueous coating emulsion. Substances particularly useful for this purpose are those which render the interior wall of the casing hydrophobic to the desired degree. Especially advantageous are isocyanates or ethylenimines containing a hydrophobic radical such as a fatty acid residue. Stearyl isocyanate and general, fatty isocyanates and N-fatty-ethylenimines derived from $C_8$–$C_{26}$ fatty acids, preferably $C_{12}$–$C_{18}$ fatty acids, may be employed.

Still other substances especially advantageous for use in place of a dimer of a higher ketene are water-soluble fatty chromium Werner complexes such as stearato chromic chloride. In general, any fatty chromium complex, preferably a fatty chromium chloride complex, derived from $C_8$–$C_{26}$ fatty acids, preferably $C_{12}$–$C_{18}$ fatty acids, may be employed. However, the stearato chromic chloride version is greatly preferred. If desired, aluminum, copper or zirconium Werner complexes may be employed instead of chromium Werner complexes.

Ingredient B

The water-insoluble, monomeric fatty material with a polar end group and having an HLB number from 1 to 10 may be a fatty alcohol, fatty amine, fatty amide, fatty acid, fatty ester, etc., the fatty substituent ranging from $C_8$–$C_{26}$, preferably $C_{12}$–$C_{18}$.

Fatty alcohols useful in the method of this invention include $C_8$–$C_{12}$, preferably $C_{12}$–$C_{18}$, alcohols. Cetyl alcohol is preferred. It has a melting point of 49.6° C. and is molten during the drying of the coating.

Fatty amines which can be used include those of the formula $R^1NR^2R^3$, where $R^1$ is a $C_8$–$C_{26}$ saturated or unsaturated aliphatic group, and $R^2$ and $R^3$ are hydrogen or $C_1$–$C_{26}$ hydrocarbon groups. Satisfactory amines are those with an HLB number of 1 to 10.

Fatty acids and amides which may be used include $C_8$–$C_{26}$ fatty acids and fatty amides, either straight chain or branched chain, saturated or unsaturated. The acids and amides, which are satisfactory have an HLB number of 1 to 10.

Fatty esters may be used in which the fatty substituent, $C_8$–$C_{28}$ aliphatic, is present in either portion of the molecule. Esters of the formula $R^1COOR^2$, where at least one of the groups $R^1$ and $R^2$ is $C_8$–$C_{26}$ aliphatic, and having an HLB number of 1 to 10, may be used. Partial fatty esters of glycerol and acetylated fatty esters of glycerol, sold commercially as the Myverols and Myvacets, respectively, are particularly useful.

Ingredient C

The fatty surfactant should be an at least partially water-soluble surfactant having an HLB number greater than 7 and giving a surface tension less than 50 dynes/cm.$^2$ at 0.2% concentration in water. Polyoxyethylene and polyoxypropylene surfactants are preferred.

The surfactants which are used are of the general formula

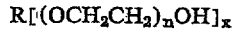

and

where R is derived from an active hydrogen containing organic group, such as a $C_8$–$C_{26}$ saturated or unsaturated aliphatic alcohol, glycol, polyol, phenol, aromatic alcohol, thiols, amines, etc., n is 2 to 40, and x is 1 to 6. Particularly useful are the BRIJ surfactants which are produced by reaction of 2 to 20 mols of ethylene oxide with one mol of a $C_{12}$–$C_{18}$ saturated or unsaturated aliphatic alcohol. These materials vary from viscous oils up to waxy solids. Other satisfactory surfactants include the fatty acid esters of sorbitan and ethoxylated derivatives thereof. Mixtures of two or more surfactants may be used.

HLB number

In the selection of ingredients (B) and (C) of the coating emulsion, one of the most important characteristics of these components is the HLB (hydrophile-lipophile balance). In the surface chemistry of emulsions, the HLB number is used to characterized the relative simultaneous attraction of an emulsifier for water and for oil. The definition of the HLB number and the calcuset forth in the Encyclopedia of Chemical Technology, Kirk-Othmer, John Wiley and Sons, Inc., vol. 8, second edition, pp. 117–154. In characterizing ingredients (B) and (C), the HLB number is not used for defining the emulsifying characteristics but rather is used merely to define the class of compounds or compositions which are operative in the coating composition. This ingredient (B) must have an HLB number of 1 to 10, while ingredient (C) must have an HLB number greater than about 7.

In carrying out the method of this invention, an aqueous emulsion of the coating composition is prepared and applied as a coating to the ultimate meat-contacting surface of gel cellulosic or other casing (or sheet material from which the casing is to be formed) so that an amount in the range from about 0.01 to 0.2% of the ketene dimer, etc., based on the weight of the casing, is incorporated in the casing. Lesser or greater amounts may be used as desired, although, generally, very slight or very great amounts of the first ingredient of the aqueous emulsion do not materially increase the effectiveness of the treatment and may even decrease it. The casing is heated following the coating step to remove water and accelerate the interaction between the reactive component of the coating and the casing surface. The drying step is preferably sufficient to reduce the moisture content of the casing down to 10% and preferably to 5%.

The coating can be applied to the casing surface in any desired way. Thus, application to conventional regenerated cellulose casing or fibrous casing, or any other kind of casing, can be made by coating the inside surfaces of the tubular casing by a technique which involves the use of a slug of aqueous solution, emulsion, or suspension of the coating composition inside the tube. In this method of coating, the casing moves while the slug of liquid remains still with the result that the inner surface of the casing is wetted and then moves on beyond the slug to a drying atmosphere.

This technique is better illustrated in the following description of the slug coating method as applied to a commercial production line of either regenerated cellulose tubing or casing or paper reinforced regenerated cellulose casing which is known in the trade as fibrous casing.

Referring to the drawing, casing which may be wet fibrous casing or wet regenerated cellulose casing 1 in a collapsed flat form is transferred from a bath (not shown) in which the fibrous casing has been washed after being impregnated with viscose followed by regeneration, or in the case of regenerated cellulose casing after regeneration (both of these being well known procedures for the production of fibrous or regenerated cellulose casing), into a slack box 3, by passage over carryover rolls 2. Between the rolls 2 and the slack box 3, an aqueous emulsion of the coating composition containing from 0.01 to 2.5% of each of ingredients (A), (B), and (C), above, is placed within the casing 1, the emulsion being admitted through a cut 5 in the casing 1 before rubber couplers 6 are tied into the casing 1.

The slug 4 of the emulsion lies at the bottom of the slack box 3 and as the casing 1 moves as shown, the interior of the casing 1 is progressively contacted with the slug 4, and is forced open to conform to the configuration of slug 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is dried further at a temperature of 200° F. for about 5 minutes. In this last drying stage, the ketene dimer (or other hydrophobic reactive coating material) continues and/or completes its interaction with the casing due, presumably, to reaction between the ketene dimer (or other reactive functional group) and the casing surface as sodium bicarbonate. While 0.5% to 2.0% of sodium bicarbonate is a convenient amount and kind of alkaline material used under the particular conditions described, other amounts and kinds of alkaline buffers can be, of course, used, with the desiderata being the obtention of dried casing which is neutral or slightly alkaline. Any well known alkaline buffer which will bring the pH of the coating emulsion to about from 7.7 to 8.0 is useable. The advantage of having the inside of the casing at a slightly alkaline, or a neutral condition, is that reaction of the coating components with cellulose casing is best at this range of pH.

Wet regenerated cellulose casing combing off the production line may have a pH of 6.8 to 7.2. With the pH of the ketene dimer-containing aqueous slug (or other coating emulsion) at 7.8 to 8.0, the pH of the resulting casing, after drying will range from about 7.6 to 8.2.

If the pH of the wet regenerated cellulose casing is on the alkaline side (e.g. above about pH 8) the ketene dimer emulsion (or other coating emulsion) is reduced correspondingly in pH. Generally, the pH of the coating emulsion is in the range from about 3.0 to 9.0 and is selected so that the pH of the casing, after drying, will be only slightly alkaline.

The drying time and temperature are interdependent factors insofar as effecting the drying of the casing and reaction of the dimer with the casing surface are concerned, as will be apparent to those skilled in the art. Other combinations of time and temperature besides those illustrated above can be used, provided, of course, that the temperature is not so high and time not so long that the casing itself is injured due to weakening, discoloration, embrittlement or the like. For the best results a temperature of about 175° F. or higher should be used.

Under the above described coating and drying conditions, and with the above described types of coating compositions, a number of runs were made, using both fibrous and regenerated cellulose casings as the casing being treated. Various sizes of casing were coated on the inside using the above described application technique and the coating compositions of the following non-limiting examples which are illustrative of this invention. All parts are by weight or weight percent unless otherwise indicated.

EXAMPLE 1

In this example, the use of an aqueous emulsion or coating composition of a mixture of ketene dimers, cetyl alcohol, a polyoxyethylene ether of cetyl alcohol, and sodium bicarbonate to coat the inside gel cellulosic sausage casing is shown.

An aqueous emulsion was prepared by placing approximately 18 liters of soft water in a mixing tank, heating the water to about 70° C. during agitation with an impeller, stopping the heating and continuing the agitation. 450 grams of BRIJ 56 (polyoxyethylene cetyl ether) and 450 grams of cetyl alcohol are then added, followed by additional mixing for 5 minutes. 450 grams of Aquapel 364 (a mixture of palmitic and stearic ketene dimers) is then added, followed by additional mixing for 5 minutes. 9000 grams of 99% glycerol is then added. Sufficient cold soft water to bring the bath up to 90 liters is then added, followed by addition of 900 grams of sodium bicarbonate. The bath is maintained at 25° C. using slow agitation. The emulsion is ready for use within 24 hours at this temperature.

The above emulsion was applied to both gel fibrous and gel regenerated cellulose casings of various sizes according to the coating and drying technique described above. The inner surface of the casing has a contact angle in the range of 70°–90° with respect to water droplets and 40°–70° with respect to oil droplets (vegetable oil, such as cottonseed oil). When the casing is stuffed with sausage emulsion and processed, the casing is easily stripped Signed and sealed this 30th day of May 1972.

[SEAL]

Attest:

EDWARD M. FLETCHER, JR.
*Attesting Officer.*

ROBERT GOTTSCHALK
*Commissioner of Patents.*